UNITED STATES PATENT OFFICE.

HARRY P. BASSETT, OF CYNTHIANA, KENTUCKY.

PROCESS OF SEPARATING THE POTASSIUM CONTENT OF POTASSIUM-CONTAINING LIQUORS.

1,380,035.  Specification of Letters Patent.  Patented May 31, 1921.

No Drawing.  Application filed June 12, 1920. Serial No. 388,662.

*To all whom it may concern:*

Be it known that I, HARRY P. BASSETT, a citizen of the United States, residing at Cynthiana, in the county of Harrison and State of Kentucky, have invented certain new and useful Improvements in Processes of Separating the Potassium Content of Potassium-Containing Liquors, of which the following is a specification:

This invention relates to a process of separating the potassium content of potassium containing liquors such, for example, as the brines from certain lakes in Nebraska.

Some of these brines contain principally potassium carbonate, usually with minor quantities of sodium chlorid or sodium carbonate, or both. Others contain principally sodium sulfate, usually with smaller quantities of sodium chlorid or sodium carbonate or both. Frequently, a brine containing principally potassium carbonate also will contain smaller quantities of sodium sulfate. Similarly, a brine containing principally sodium sulfate frequently will contain smaller quantities of potassium carbonate.

Now, I have discovered that if a mixture of brines is produced in which the potassium carbonate and sodium sulfate are present in approximately molecular proportions, or in which the sodium sulfate is present in excess of molecular proportions with respect to the potassium carbonate, sodium carbonate and potassium sulfate will be produced, and that the potassium sulfate can be separated and recovered easily and economically, and if desired, in a pure state.

The reaction of the potassium carbonate and sodium sulfate does not take place quantitatively, but with equal molecular proportions, occurs to the extent of about 80 per cent. of the theoretical reaction.

But, in attempting to crystallize out and remove the potassium sulfate, as the brine or brine mixture becomes more or less depleted of the sulfate ion, a reverse reaction occurs, resulting in the formation of sodium sulfate and potassium carbonate, or one or more of the lower double sulfates of sodium and potassium. To avoid this, I provide for the addition of sufficient sulfate ion, preferably in the form of sodium sulfate, either at the outset or and preferably, in successive steps as the potassium sulfate is removed, to insure preventing the occurrence of this reverse reaction and permit of the removal of successive crops of potassium sulfate crystals in a continuous cycle of operation.

The mixtures of brines which I have treated contained potassium sulfate, sodium carbonate, sodium sulfate, a small amount of sodium chlorid with unimportant amounts of other salts which, being regarded merely as impurities, need not be considered in connection with the present process. Such mixtures can be readily made by a judicious selection of brines and their mixture in proper proportions in accordance with my invention. If insufficient sodium sulfate is present in any brine mixture, sufficient of the salt must be added for the conversion of the potassium carbonate into potassium sulfate and in practice, I prefer to employ sufficient brine containing principally sodium sulfate to insure a substantial excess of this salt, so that the resulting brine mixture will contain approximately from 5 to 30 per cent. by weight of excess sodium sulfate.

In the treatment of the mixture of brines, I evaporate it to 35° to 37° Bé., and allow it to cool, thereby producing a crop of crystals of potassium sulfate which, in practice I found to analyze about 40 per cent. $K_2O$, the principal impurities being sodium sulfate and a small amount of carbonates, principally sodium carbonate.

These crystals are washed with a substantially saturated solution of a metal sulfate which will not combine with the carbonate present to form a precipitate, preferably an alkali metal sulfate such as sodium sulfate or potassium sulfate, and in practice, I have found it advantageous to employ a saturated solution of sodium and potassium sulfates.

This washing treatment removes the carbonates and some of the sodium sulfate, raising the grade of the potassium sulfate so that it analyzes about 45 per cent. $K_2O$. The salt is then washed with a small amount of water for the purpose of further purifying it but principally to remove the wash solution used in removing the carbonates, so that the salts present in this wash water after use, may be made use of in the further practice of the process. This washing operation removes the sodium sulfate and raises the grade of the salt so that it analyzes about 50 per cent. $K_2O$. The process of purification may be continued until the salt is of the desired degree of purity, but such further purification is unnecessary to the production of a commercially salable product.

The first wash solution is returned to the evaporator in which the brine mixture is evaporated, thereby providing a substantial addition of the sulfate ion to prevent the reverse reaction which would occur if the liquid under treatment were permitted to become depleted of such ion, as hereinbefore explained. In practice, I prefer to employ sufficient of the sulfate containing wash liquor in treating the salt, to supply to the brine mixture approximately the equivalent of the sulfate ion removed in the potassium sulfate and this principle is preferably observed in the case of each sulfate wash solution.

The second wash or wash water which in the practice of the process is substantially saturated with the sulfate salt is conveyed to the sulfate wash tank for reuse.

It will be noted that in both washing operations, the sodium sulfate withdrawn is returned to the system and serves to prevent the formation of potassium carbonate by the reverse reaction referred to above, or to decompose such salt if formed, producing potassium sulfate.

The process as described is continued until the solution, when brought again to 35° to 37° Bé., will throw down sodium carbonate from the hot solution. This precipitation of sodium carbonate usually occurs immediately after the separation of one crop of potassium sulfate crystals, followed by evaporation, as when the sodium sulfate and potassium carbonate are present in approximately equal molecular proportions in the brine mixture and the amount of potassium salt is small. If the potassium salt is present in a considerable amount in the brine mixture two or even three crops of potassium sulfate crystals may be produced in the mother liquor when cooled, before a crop of sodium carbonate crystals is produced in the hot liquor. In some unusual cases a crop of sodium carbonate crystals will be produced in the hot liquor before the production of a crop of potassium sulfate crystals is produced as when the amount of the carbonate in the brine mixture is unusually large but this does not interfere with the operation of the process as described. The sodium carbonate crystals produced as described are removed and washed with a concentrated solution of sodium carbonate which removes any sulfates or chlorids which may be present. This is followed by washing with water.

The washing operation may be continued until sodium carbonate of the desired purity is obtained.

The first washing solution is returned to the evaporator in which the brine is evaporated. The second wash or wash water is transferred to the sodium carbonate wash tank to be used again. After the removal of the sodium carbonate crystals, the solution is allowed to cool, thereby producing another crop of potassium sulfate of the 40 per cent. $K_2O$ grade, which is treated as hereinbefore described.

The solution is then further evaporated until a substantial amount of crystals are formed therein while the solution is hot. At this stage of the process, the quantity of sodium sulfate present has increased or been built up by the addition of the washing liquors so that it will crystallize out from the hot solution before the sodium carbonate. This crop of crystals consisting principally of sodium sulfate, is removed and washed with a concentrated solution of sodium sulfate to remove carbonates and chlorids, and is then washed with water, the washing operation being continued, if desired, to obtain sodium sulfate of any required purity. The wash solution first used is returned to the brine evaporator, and the second wash or wash water transferred to the sodium sulfate wash tank to be used again.

The solution, after the removal of the crop of sodium sulfate crystals, is then further evaporated to produce another crop of sodium carbonate crystals in the hot mother liquor. This salt is removed and treated, as already described in connection with the first crop of sodium carbonate crystals. The solution is then allowed to cool, producing a further crop of potassium sulfate crystals of the 40 per cent. $K_2O$ grade. This cycle of operation can be kept up until substantially all of the potassium containing salt is removed or and preferably, a predetermined quantity of the brine mixture to maintain the supply, may be added to the liquid under treatment at successive stages of the process, preferably after the removal of each crop of sulfate salt crystals, so that the process can be continued indefinitely.

In the ordinary practice of the process, a crop of potassium sulfate crystals is first produced upon evaporation and cooling as described. Then upon further evaporation, a crop of sodium carbonate crystals will be thrown down in the hot solution. Upon cooling without further evaporation, a second crop of potassium sulfate crystals is obtained. Upon further evaporation, sodium sulfate crystals are ordinarily next obtained in the hot liquor following the removal of which and further evaporation, a crop of sodium carbonate crystals is obtained. Upon cooling, potassium sulfate crystals are next obtained and this cycle of operations and results continued indefinitely. When the evaporation and crystallization is carried out in a single vessel, it is sometimes necessary to test the crystals thrown down from the hot liquor to determine whether they are crystals of sodium carbonate or sodium sulfate. This, of course, presents no difficulty to the chemist operating the process, but in practice, it has been found that in the treatment of any brine mixture, the precipitation of the different salts will take place in an orderly unchanged sequence.

The process described can be carried out with practical success, irrespective of the amount of sodium chlorid present in the brine mixture. One difficulty, however, encountered in the practice of the process, as described, when the proportion of sodium chlorid in the brine mixture is small, is that the precipitation of sodium sulfate and sodium carbonate overlap. This can be advantageously avoided by introducing some neutral alkali metal salt, preferably sodium chlorid, into the original brine mixture or into the solution after the removal of a portion of the potassium sulfate therefrom. The quantity of sodium chlorid or other neutral salt need be only sufficient to prevent the overlapping of the precipitation of sodium sulfate and sodium carbonate, which can be readily determined by adding the sodium chlorid or other salt employed for this purpose until this overlapping is prevented. In practice, I prefer to have in the brine mixture a quantity of the sodium chlorid equal to from one-third to one-half the amount by weight, of the sodium carbonate present. In making use of sodium chlorid to prevent the overlapping of the precipitation of the sodium sulfate and sodium carbonate, I may advantageously employ as a constituent of the brine mixture, a brine containing a considerable amount of sodium chlorid in solution therein. It is to be understood, however, that salt from any source may be employed.

When sodium chlorid is used, the sodium sulfate crystallized out will have sodium chlorid as an impurity instead of the sodium carbonate. On washing the removed sodium sulfate crystals with a solution of sodium sulfate, the sodium chlorid will be washed out and will be returned to the system to continue the performance of the function of preventing the overlapping of the precipitation of sodium sulfate and sodium carbonate. When the sodium chlorid is used as described, the sodium carbonate crystallized out also will have sodium chlorid as an impurity instead of the sodium sulfate, but on washing the sodium carbonate crystals with a solution of sodium carbonate, the sodium chlorid will be washed out and returned to the evaporator to continue its function, as described.

The use of the added sodium chlorid has a decided advantage in holding up the potash in the hot liquor as KCl, but, being mixed with sodium sulfate, the solution on cooling will deposit the potash as potassium sulfate (40 $K_2O$ grade).

In making use of the added sodium chlorid, the process is carried out as herein before described, but as will be understood, sodium chlorid will be the principal impurity to be separated from the sodium sulfate and the sodium carbonate.

In such use of sodium chlorid, the reaction into which this salt enters, in the hot mother liquor, is believed to be as follows:

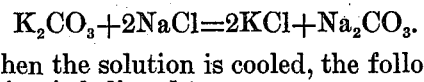

When the solution is cooled, the following reaction is believed to occur:

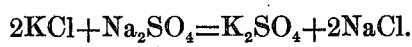

While I prefer to use sodium chlorid for the purpose of preventing overlapping of the precipitation of sodium sulfate and sodium carbonate, I may employ sodium bromid, sodium iodid, sodium nitrate, or any other neutral alkali metal salts, even sodium acetate being capable of such use.

It will be noted that the addition of sodium chlorid, or its equivalent, is made but once, and that it remains in the system performing its function as outlined above.

In the practice of my process, either with or without the use of added sodium chlorid or its equivalent, it is to be understood that the liquor under treatment is subjected to the operation described in a continuous cycle until all values are recovered, more of the brine mixture being preferably added from time to time, to maintain the supply.

While I have described in detail, two methods of practising my invention, it is to be understood that these examples are illustrative rather than restrictive, that the process may be variously modified, and that known chemical equivalents of the materials employed may be used, all without departing from the spirit of my invention or the scope of the subjoined claims.

I claim:

1. A process of separating the potassium content of a liquid containing potassium carbonate which consists in adding thereto sodium sulfate in such amount that the sodium sulfate will be present in the resulting solution in at least molecular proportions with respect to the potassium carbonate, removing by evaporation and crystallization sodium carbonate from the hot solution, thereby promoting the formation of potassium sulfate and cooling and, when the solution is cooled, separating the resulting potassium sulfate by crystallization from the cooled solution.

2. A process of separating the potassium content of a liquid containing potassium carbonate which consists in adding thereto sodium sulfate in such amount that the sodium sulfate will be present in the resulting solution in at least molecular proportions with respect to the potassium carbonate, removing by successive evaporations and crystallizations sodium carbonate from the hot solution, thereby promoting the formation of potassium sulfate and, following each removal of sodium carbonate, cooling and, when the solution is cooled, separating the resulting potassium sulfate by crystallization from the cooled solution.

3. A process of separating the potassium content of a liquid containing potassium carbonate which consists in adding thereto sodium sulfate in such amount that the sodium sulfate will be present in the resulting solution in at least molecular proportions with respect to the potassium carbonate, removing by successive evaporations and crystallizations sodium carbonate from the hot solution, thereby promoting the formation of potassium sulfate and, following each removal of sodium carbonate, cooling and when the solution is cooled, separating the resulting potassium sulfate by crystallization from the cooled solution, a sulfate being added to the mother liquor to prevent the depletion of the sulfate ion.

4. A process of separating the potassium content of a liquid containing potassium carbonate which consists in adding thereto sodium sulfate in such amount that the sodium sulfate will be present in the resulting solution in at least molecular proportions with respect to the potassium carbonate, removing by successive evaporations and crystallizations sodium carbonate from the hot solution, thereby promoting the formation of potassium sulfate and, following each removal of sodium carbonate, cooling and, when the solution is cooled, separating the resulting potassium sulfate by crystallization from the cooled solution, washing each crop of potassium sulfate crystals with a solution containing sodium sulfate and adding the wash liquor to the mother liquor to prevent depletion of the sulfate ion in the solution.

5. A process of separating the potassium content of a liquid containing potassium carbonate which consists in adding thereto sodium sulfate in such amount that the sodium sulfate will be present in the resulting solution in at least molecular proportions with respect to the potassium carbonate, removing by successive evaporations and crystallizations sodium carbonate from the hot solution, thereby promoting the formation of potassium sulfate and, following each removal of sodium carbonate, cooling and when the solution is cooled, separating the resulting potassium sulfate by crystallization from the cooled solution, washing each crop of potassium sulfate crystals with a solution containing sodium sulfate and potassium sulfate and adding the wash liquor to the mother liquor.

6. A process of separating the potassium content of a liquid containing potassium carbonate which consists in adding thereto sodium sulfate in such amount that the sodium sulfate will be present in the resulting solution in at least molecular proportions with respect to the potassium carbonate, separating the resulting potassium sulfate by successive evaporations and crystallizations, sodium sulfate being added to the mother liquor to prevent depletion of the sulfate ion, removing by evaporation and crystallization sodium carbonate from the hot solution, thereby promoting the formation of potassium sulfate and cooling and, when the solution is cooled, separating the resulting potassium sulfate from the cooled solution.

7. A process of separating the potassium content of a liquid containing potassium carbonate which consists in adding thereto sodium sulfate in such amount that the sodium sulfate will be present in the resulting solution in at least molecular proportions with respect to the potassium carbonate, separating the resulting potassium sulfate by successive evaporations and crystallizations, sodium sulfate being added to the mother liquor to prevent depletion of the sulfate ion, removing by evaporation and crystallization sodium carbonate from the hot solution, thereby promoting the formation of potassium sulfate, cooling and, when the solution is cooled, separating the resulting potassium sulfate from the cooled solution, continuing to add sodium sulfate and continuing the evaporation until a crop of sodium sulfate crystals is produced in the hot solution, and removing the sodium sulfate crystals.

8. A process of separating the potassium content of a liquid containing potassium carbonate which consists in adding thereto sodium sulfate in such amount that the sodium sulfate will be present in the resulting solution in at least molecular proportions with respect to the potassium carbonate, separating the resulting potassium sulfate by successive evaporations and crystallizations, sodium sulfate being added to the mother liquor to prevent depletion of the sulfate ion, removing by evaporation and crystallization sodium carbonate from the hot solution, thereby promoting the formation of potassium sulfate, cooling and, when the solution is cooled, separating the resulting potassium sulfate from the cooled solution, continuing to add sodium sulfate and continuing the evaporation until a crop of sodium sulfate crystals is produced in the hot solution, removing the sodium sulfate crystals, continuing the evaporation until a crop of crystals of sodium carbonate is produced, and removing the sodium carbonate crystals.

9. In the process set forth in claim 8, the step of adding to the solution under treatment prior to the production of sodium sulfate crystals therefrom, a neutral alkali metal salt adapted to prevent overlapping of the precipitation of sodium sulfate and sodium carbonate.

10. In the process set forth in claim 8, the step of adding to the solution under treatment prior to the production of the sodium sulfate crystals therefrom, sodium chlorid in sufficient amount to prevent overlapping of the precipitation of sodium sulfate and potassium carbonate.

11. A process of separating the potassium content of a liquid containing potassium carbonate which consists in adding thereto sodium sulfate in such amount that the sodium sulfate will be present in the resulting solution in at least molecular proportions with respect to the potassium carbonate, separating the resulting potassium sulfate by successive evaporations and crystallizations, sodium sulfate being added to the mother liquor to prevent depletion of the sulfate ion, the process being continued until a crop of sodium carbonate crystals is produced in the hot solution, removing the sodium carbonate salts and cooling the mother liquor to produce another crop of potassium sulfate crystals, continuing to add sodium sulfate and continuing the evaporations until a crop of sodium sulfate is produced in the hot mother liquor, removing the sodium sulfate, continuing the evaporation until a crop of sodium carbonate crystals is produced in the hot liquor, removing the sodium carbonate and allowing the liquor to cool to produce another crop of potassium sulfate crystals.

12. In the process set forth in claim 11, the step of adding to the solution under treatment prior to the production of sodium sulfate crystals therefrom, a neutral alkali metal salt adapted to prevent overlapping of the precipitation of sodium sulfate and sodium carbonate.

13. In the process set forth in claim 11, the step of adding to the solution under treatment prior to the production of the sodium sulfate crystals therefrom, sodium chlorid in sufficient amount to prevent overlapping of the precipitation of sodium sulfate and potassium carbonate.

14. A process of separating the potassium content of a liquid containing potassium carbonate which consists in adding thereto sodium sulfate in such amount that the sodium sulfate will be present in the resulting solution in at least molecular proportions with respect to the potassium carbonate, separating the resulting potassium sulfate by evaporation and crystallization, washing such sulfate crystals with a wash liquor containing sodium sulfate and potassium sulfate, adding the resulting wash liquor to the mother liquor and again removing potassium sulfate therefrom by evaporation and crystallization.

In testimony whereof I affix my signature.

HARRY P. BASSETT.